(12) United States Patent
Muto et al.

(10) Patent No.: US 12,076,819 B2
(45) Date of Patent: Sep. 3, 2024

(54) LASER PEENING PROCESSING DEVICE AND LASER PEENING PROCESSING METHOD

(71) Applicant: SUBARU CORPORATION, Tokyo (JP)

(72) Inventors: Masahiko Muto, Tokyo (JP); Yoshitomo Oguma, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 306 days.

(21) Appl. No.: 16/403,042

(22) Filed: May 3, 2019

(65) Prior Publication Data
US 2020/0055145 A1 Feb. 20, 2020

(30) Foreign Application Priority Data
Aug. 20, 2018 (JP) ................................. 2018-154318

(51) Int. Cl.
*B23K 26/356* (2014.01)
*B23K 26/00* (2014.01)
(Continued)

(52) U.S. Cl.
CPC .......... *B23K 26/356* (2015.10); *B23K 26/009* (2013.01); *B23K 26/0626* (2013.01);
(Continued)

(58) Field of Classification Search
CPC ............................ B23K 26/356; B23K 26/146; B23K 26/1464; B23K 26/0665; B23K 26/083;
(Continued)

(56) References Cited

U.S. PATENT DOCUMENTS 6,163,012 A * 12/2000 Kimura ................ B23K 26/106
219/121.63
8,999,072 B2 * 4/2015 Varrin, Jr. ............. F22B 37/002
134/22.12
(Continued)

FOREIGN PATENT DOCUMENTS

CN  101981302 A  2/2011
CN  106119518 A  11/2016
(Continued)

OTHER PUBLICATIONS

Extended European Search Report issued in corresponding European Patent Application No. 19173531.5-1016, dated Nov. 26, 2019.
(Continued)

*Primary Examiner* — Janie M Loeppke
*Assistant Examiner* — Simpson A Chen
(74) *Attorney, Agent, or Firm* — Rimon P.C.

(57) ABSTRACT

A laser peening processing device includes a laser oscillator configured to oscillate a laser beam; and a nozzle configured to inject liquid to a workpiece for laser peening processing, and to cause the laser beam to be incident on the liquid to irradiate the workpiece with the laser beam which propagates through the liquid. The nozzle includes a lens configured to concentrate the laser beam so that a focal point of the laser beam is formed at a processing position of the laser peening processing, a cylindrical casing configured to protect the laser beam before the laser beam is incident on the liquid, and a pipe disposed in the casing and configured to form a flow path for the liquid.

12 Claims, 11 Drawing Sheets

(51) Int. Cl.
  *B23K 26/06*     (2014.01)
  *B23K 26/08*     (2014.01)
  *B23K 26/14*     (2014.01)
  *B23K 26/146*    (2014.01)
  *C21D 7/06*      (2006.01)
  *C21D 10/00*     (2006.01)

(52) U.S. Cl.
  CPC ...... *B23K 26/0648* (2013.01); *B23K 26/0652* (2013.01); *B23K 26/0665* (2013.01); *B23K 26/083* (2013.01); *B23K 26/146* (2015.10); *B23K 26/1464* (2013.01); *C21D 7/06* (2013.01); *C21D 10/005* (2013.01)

(58) Field of Classification Search
  CPC ......... B23K 26/1482; H02J 9/06; C21D 7/06; C21D 10/005
  USPC .................................................... 219/121.61
  See application file for complete search history.

(56) References Cited

U.S. PATENT DOCUMENTS

| | | | | |
|---|---|---|---|---|
| 9,186,751 | B2 * | 11/2015 | Chida | B23K 26/1476 |
| 10,819,079 | B2 * | 10/2020 | Dulaney | C21D 10/005 |
| 11,027,369 | B2 * | 6/2021 | Nakano | B23K 26/08 |
| 2006/0141754 | A1 * | 6/2006 | Tanaka | H01L 21/02422 |
| | | | | 438/479 |
| 2007/0262063 | A1 * | 11/2007 | Sano | B23K 26/0876 |
| | | | | 219/121.85 |
| 2008/0105666 | A1 * | 5/2008 | Adachi | C21D 10/005 |
| | | | | 219/121.6 |
| 2008/0269729 | A1 * | 10/2008 | Ledermann | H02J 9/06 |
| | | | | 702/81 |
| 2011/0005493 | A1 | 1/2011 | Hirano et al. | |
| 2013/0313232 | A1 * | 11/2013 | Sano | B23K 26/106 |
| | | | | 219/121.62 |
| 2015/0165559 | A1 * | 6/2015 | Gaebelein | B23K 26/38 |
| | | | | 29/402.03 |
| 2016/0138127 | A1 * | 5/2016 | Nomura | B23K 26/06 |
| | | | | 219/121.84 |
| 2017/0252865 | A1 * | 9/2017 | Hu | B23K 26/146 |
| 2017/0282298 | A1 | 10/2017 | Nakano et al. | |
| 2018/0029159 | A1 | 2/2018 | Toyama et al. | |
| 2018/0290255 | A1 | 10/2018 | Yada | |
| 2019/0337095 | A1 | 11/2019 | Nakano | |

FOREIGN PATENT DOCUMENTS

| | | | | |
|---|---|---|---|---|
| CN | 106119518 | A * | 11/2016 | |
| CN | 106141425 | A | 11/2016 | |
| CN | 106944742 | A | 7/2017 | |
| CN | 107107266 | A | 8/2017 | |
| CN | 107186336 | A | 9/2017 | |
| CN | 108022853 | A | 5/2018 | |
| DE | 102008063038 | A1 * | 7/2010 | ......... B23K 26/0066 |
| JP | 2000-334590 | A | 12/2000 | |
| JP | 2001-156372 | A | 6/2001 | |
| JP | 2016026886 | A * | 2/2016 | |
| JP | 2017-127887 | A | 7/2017 | |
| JP | 2017-131907 | A | 8/2017 | |
| JP | 2017-177162 | A | 10/2017 | |
| JP | 2018-111134 | A | 7/2018 | |
| KR | 10-2011-0091984 | A | 8/2011 | |
| WO | 2016-194070 | A1 | 12/2016 | |
| WO | 2018-135082 | A1 | 7/2018 | |

OTHER PUBLICATIONS

Chinese Office Action issued in corresponding Chinese Patent Application No. 201910303984.3, dated Apr. 12, 2022, with English translation.
Notice of Reasons for Refusal received in Japanese Patent Application No. 2018-154318 on Apr. 26, 2022.
Office Action received in Korean Patent Application No. 10-2019-0065419 on Nov. 13, 2023.

* cited by examiner

LASER PEENING PROCESSING DEVICE AND LASER PEENING PROCESSING METHOD

CROSS-REFERENCE TO RELATED APPLICATIONS

The present application claims priority from Japanese Patent Application No. 2018-154318 filed on Aug. 20, 2018, the entire contents of which are hereby incorporated by reference.

BACKGROUND

The disclosure relates to a laser peening processing device and a laser peening processing method.

Laser peening processing is known as a method of reforming the surface of an object by applying residual stress to the surface. The laser peening processing is performed by concentratedly irradiating the surface to be processed of a workpiece covered with liquid with a laser beam. When the surface to be processed of a workpiece covered with liquid is concentratedly irradiated with a laser beam, it is possible to confine the plasma generated by the irradiation of the laser beam within the liquid. Consequently, the pressure of a shock wave is applied to the surface to be processed. In this manner, it is possible to cause compression stress to remain within the workpiece by plastically deforming the surface of the workpiece.

Thus, a workpiece to be processed by laser peening processing is installed in liquid such as water, or liquid such as water is injected through a nozzle to a workpiece (see, for instance, Japanese Unexamined Patent Application Publication Nos. 2017-177162 and 2017-131907). A technique of performing laser peening processing with a transparent film instead of liquid applied to a workpiece is also known.

SUMMARY

An aspect of the disclosure provides a laser peening processing device. The laser peening processing device includes a laser oscillator and a nozzle. The laser oscillator oscillates a laser beam. The nozzle injects liquid to a workpiece for laser peening processing, and causes the laser beam to be incident on the liquid to irradiate the workpiece with the laser beam which propagates through the liquid. The nozzle includes a lens, a cylindrical casing, and a pipe. The lens concentrates the laser beam so that a focal point of the laser beam is formed at a processing position of the laser peening processing. The cylindrical casing protects the laser beam before being incident on the liquid. The a pipe is disposed in the casing, and forms a flow path for the liquid.

An aspect of the disclosure provides a laser peening processing method. The method includes producing a half-finished product or a product by performing laser peening processing on the workpiece using the above-described laser peening processing device.

An aspect of the disclosure provides a laser peening processing method using a laser peening processing device. The laser peening processing device includes a laser oscillator and a nozzle. The laser oscillator oscillates a laser. The nozzle injects liquid to a workpiece for laser peening processing, and causes the laser beam to be incident on the liquid, and irradiates the workpiece with the laser beam which propagates through the liquid. The nozzle includes a cylindrical casing that protects the laser beam before entering the liquid, and a lens that concentrates the laser beam so that a focal point of the laser beam is formed at a processing position of the laser peening processing. A pipe, which forms a flow path for the liquid, is disposed in the casing, and interference between the pipe and the workpiece is avoided.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
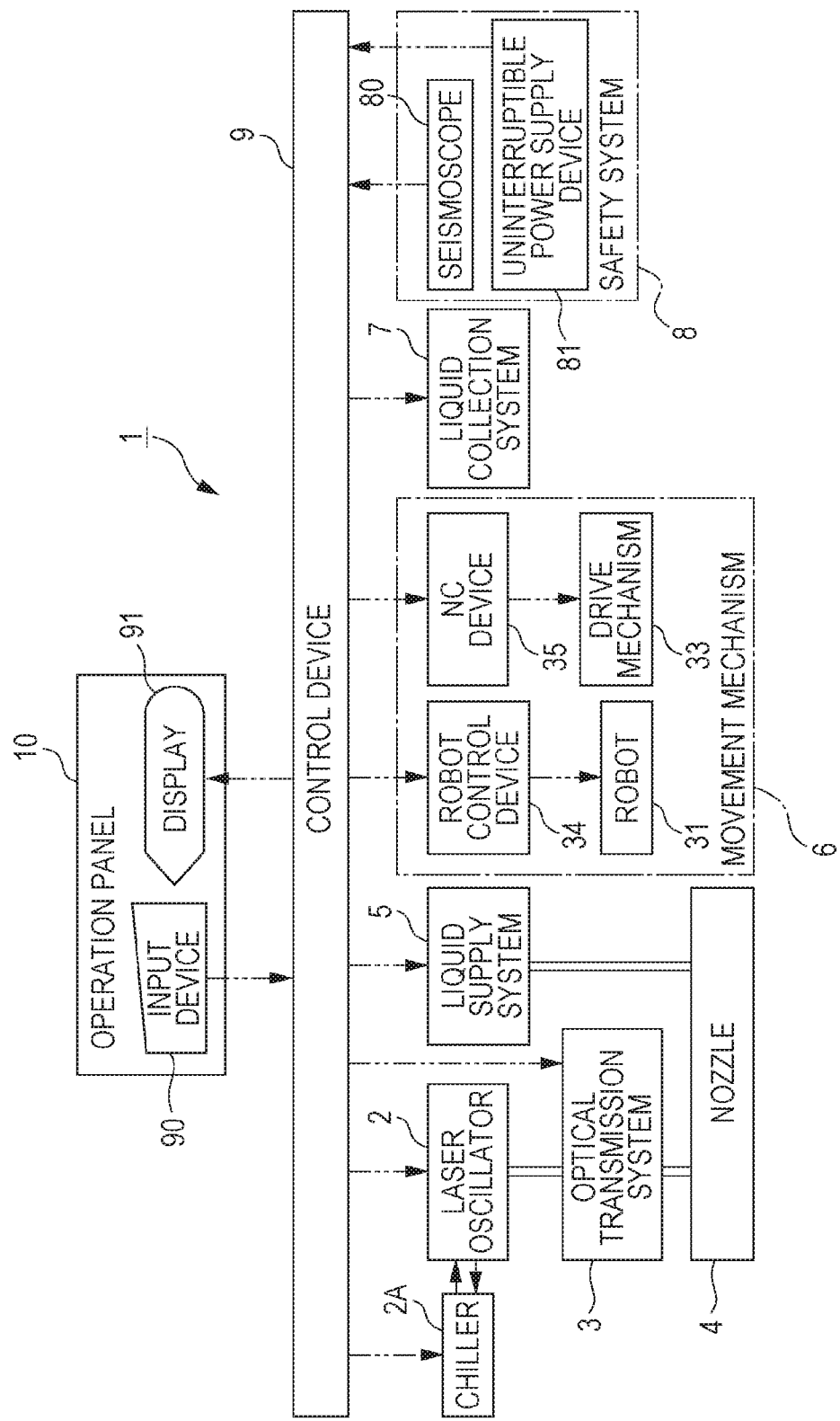
FIG. 1 is an entire configuration diagram of a laser peening processing device according to a first embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. It is desirable to provide a method of performing laser peening processing locally on a workpiece having a complicated shape.

First Embodiment (Configuration and Function of Laser Peening Processing Device)

Figure 2:
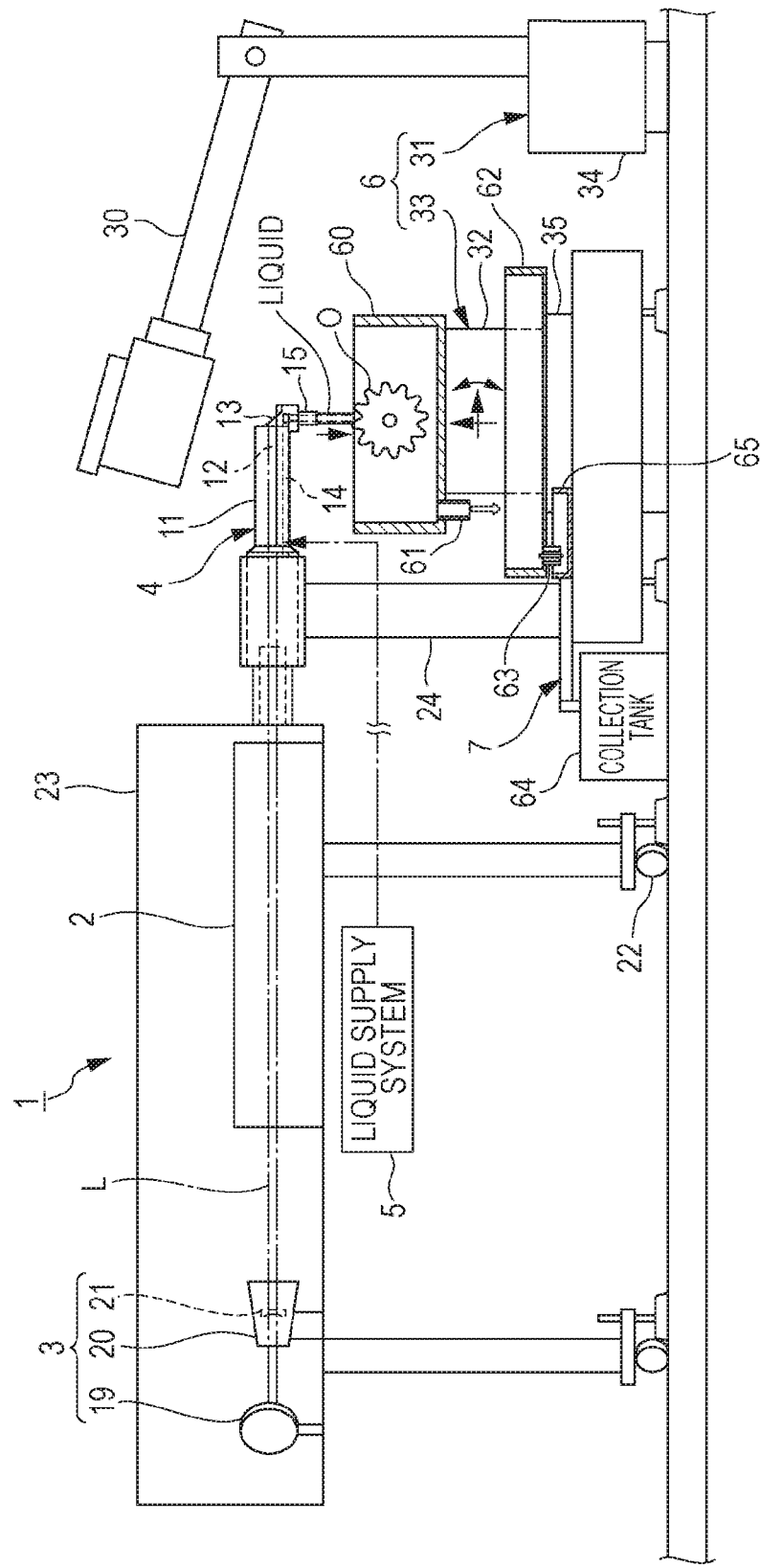
FIG. 2 is a front view illustrating a specific configuration example of primary components such as a laser oscillator, an optical transmission system, and a nozzle illustrated in FIG. 1.
Figure 3:
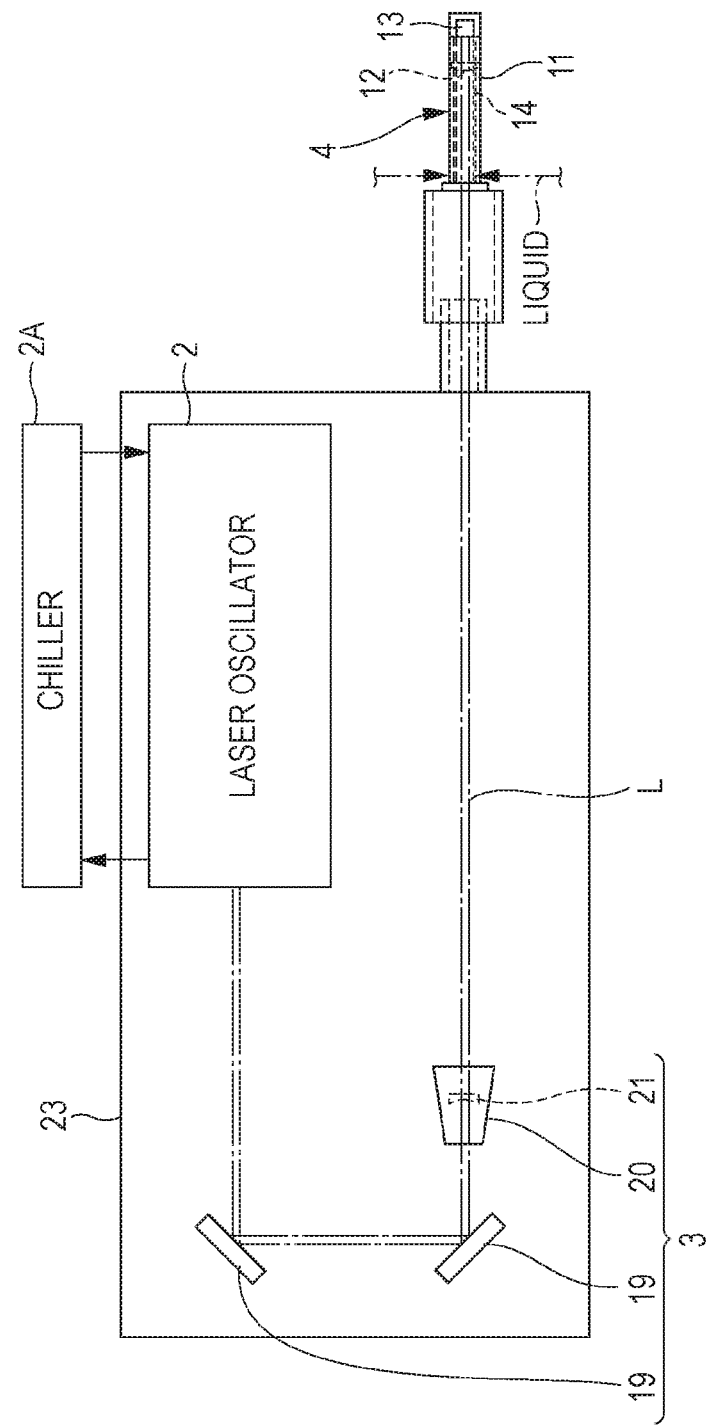
FIG. 3 is a top view of the laser oscillator, the optical transmission system, and the nozzle illustrated in FIG. 2.

FIG. 1 is an entire configuration diagram of a laser peening processing device according to a first embodiment of the disclosure, FIG. 2 is a front view illustrating a specific configuration example of primary components such as a laser oscillator, an optical transmission system, and a nozzle illustrated in FIG. 1, and FIG. 3 is a top view of the laser oscillator, the optical transmission system, and the nozzle illustrated in FIG. 2.

A laser peening processing device 1 is a device that performs laser peening processing on an object workpiece O for laser peening processing. The laser peening processing is performed by concentratedly irradiating the surface to be processed of the object workpiece O covered with liquid such as pure water or tap water with a laser beam L. When the surface to be processed of the object workpiece O covered with liquid is concentratedly irradiated with the laser beam, it is possible to confine the plasma generated by the irradiation of the laser beam L within the liquid. Consequently, the pressure of a shock wave is applied to the surface to be processed of the object workpiece O. In this manner, it is possible to cause compression stress to remain within the object workpiece O by plastically deforming the surface of the object workpiece O. Consequently, it is possible to improve the fatigue strength and corrosion resistance of the object workpiece O.

The laser peening processing device 1 is a device that injects liquid such as water to an object workpiece O while moving the object workpiece O for laser peening processing, causes a laser beam L to enter the liquid and propagate, and thereby concentratedly irradiates the object workpiece O covered with the liquid with the laser beam L. Thus, the laser peening processing device 1 may include a laser oscillator 2, an optical transmission system 3, a nozzle 4, a liquid supply system 5, a movement mechanism 6, a liquid collection system 7, a safety system 8, a control device 9, and an operation panel 10.

The laser oscillator 2 is a device that oscillates the laser beam L. In order to obtain a sufficient effect of laser peening processing, it is important to increase an intensity I of the laser beam L sufficiently. The intensity I of pulse laser is expressed by $I=E/(S \cdot t)$ where E is pulse energy, S is the area of a beam spot irradiated with a pulse laser, and t is a pulse width. Therefore, even when the pulse energy E is constant, when the pulse width t is decreased, the intensity I of the pulse laser is increased.

Thus, in addition to nanosecond laser having a pulse width t on the order of nanosecond, picosecond laser (also referred to as a short pulse laser) having a pulse width t on the order of picosecond, and femtosecond laser (also referred to as a ultrashort pulse laser) having a pulse width t on the order of femtosecond may be used as the laser beam L. A YaG laser is a typical nanosecond laser, where the wavelength is 1064 nm, 532 nm, or 355 nm.

The laser oscillator 2 generates heat as the laser beam L is oscillated. Thus, it is appropriate to mount on the laser oscillator 2 a chiller 2A that cools the laser oscillator 2 by circulating coolant as necessary.

An optical transmission system 3 is a system that transmits the laser beam L oscillated by the laser oscillator 2 to the nozzle 4. As an optical fiber usable as a transmission medium for the laser beam L, an optical fiber which transmits nanosecond laser having a pulse energy of 50 mJ or less, picosecond laser having a pulse energy on the order of microjoule or femtosecond laser having a pulse energy on the order of microjoule are only available on the market.

Thus, a system that transmits the laser beam L oscillated by the laser oscillator 2 to the nozzle 4 without using an optical fiber may be used as the optical transmission system 3. Then, as the laser oscillator 2, it is possible to use an oscillator that oscillates nanosecond laser having a pulse energy exceeding 50 mJ, picosecond laser having a pulse energy exceeding 1 mJ, or femtosecond laser having a pulse energy exceeding 1 mJ. In this case, it is possible to obtain a sufficient effect of laser peening processing.

The nozzle 4 is configured to inject liquid such as water to an object workpiece O for laser peening processing, cause a laser beam L to enter the liquid, and thereby irradiates the object workpiece O with the laser beam L propagating through the liquid.

Figure 4:
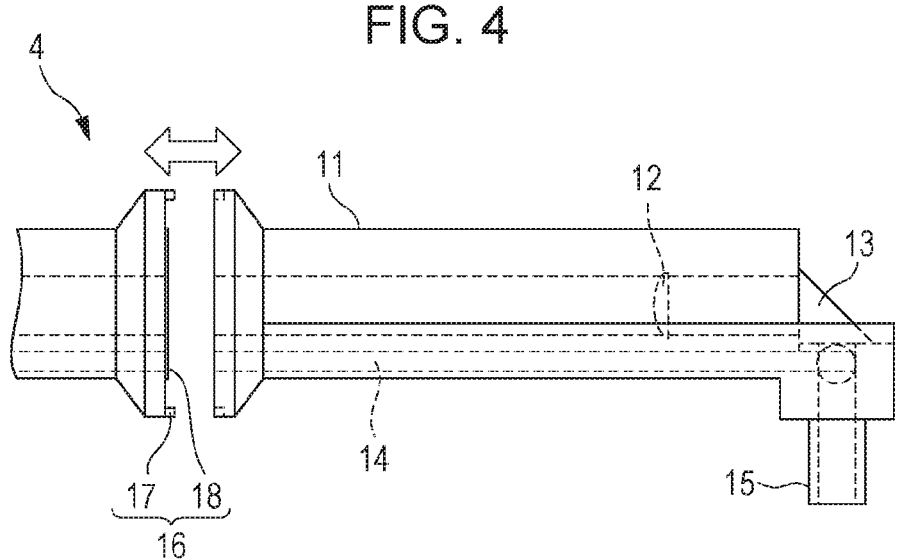
FIG. 4 is a view illustrating a detailed configuration example of the nozzle illustrated in FIG. 1.

FIG. 4 is a view illustrating a detailed configuration example of the nozzle 4 illustrated in FIG. 1.

The nozzle 4 may include a casing 11, a condenser lens 12, a prism 13, and a pipe 14. The casing 11 is a cylindrical component that protects the laser beam L before and after entering the liquid. Thus, the optical path of the laser beam L is formed in the casing 11. The condenser lens 12 is a lens for converging the laser beam L so that the focal point of the laser beam L is formed at a processing position of laser peening processing.

The prism 13 is an optical element for changing a traveling direction of the laser beam L from an incidence direction to the nozzle 4 to a vertical lower direction in order to irradiate the object workpiece O with the laser beam L. When the laser oscillator 2 is a high-output oscillator, oscillation of the laser beam L in a horizontal direction leads to stable installation of the laser oscillator 2. Therefore, a horizontal incidence direction of the laser beam L to the nozzle 4 leads to simplification of the optical transmission system 3.

Meanwhile, the direction of irradiation of the laser beam L to the object workpiece O is changed to a vertical lower direction by bending the optical path of the laser beam L by the prism 13, then the direction of injection of liquid to the object workpiece O may also be changed to a vertical lower direction, the liquid allowing the laser beam L to propagate. Thus, it is possible to avoid change in the injection direction of liquid due to the effect of the gravity. In addition, liquid can also be injected utilizing the gravity.

The pipe 14 forms the flow path of liquid. Although the flow path of liquid is formed of a nylon tube disposed externally of the nozzle 4, the pipe 14 which forms the flow path of liquid may be disposed in the casing 11. The entry of the pipe 14 is formed in the lateral surface of the casing 11, and the exit of the pipe 14 may be disposed on the emission side of the laser beam L from the prism 13.

Then, it is possible to avoid interference between the object workpiece O and the pipe 14. Consequently, it is possible to relatively dispose the nozzle 4 in a narrower place, and laser peening processing can be performed even on an object workpiece O having a complicated shape.

Figure 5:
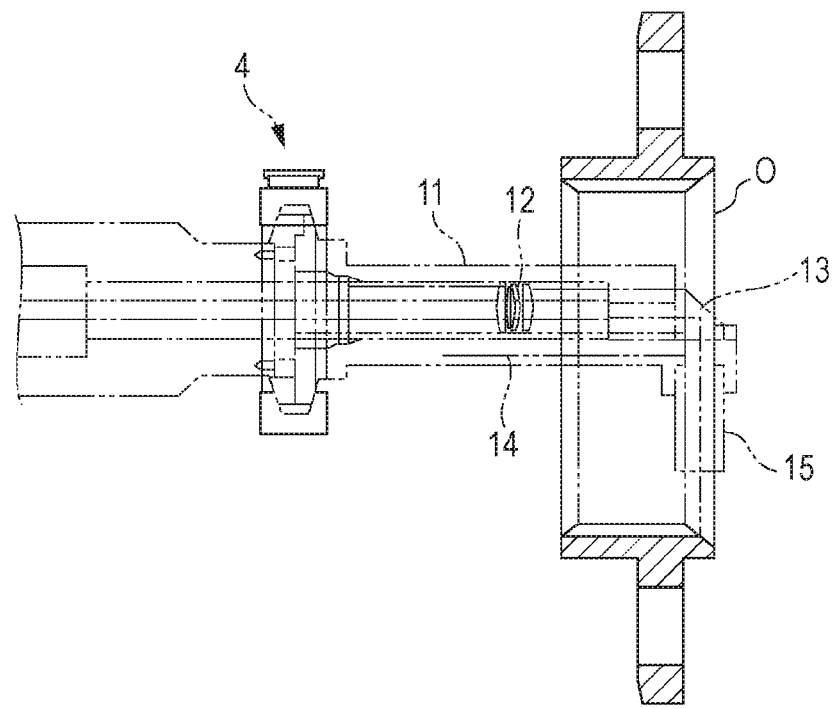
FIG. 5 is a front view illustrating an example in which the nozzle illustrated in FIG. 4 is relatively disposed so that laser peening processing can be performed on the inner tooth of an internal gear when an object workpiece for laser peening processing is the internal gear.
Figure 6:
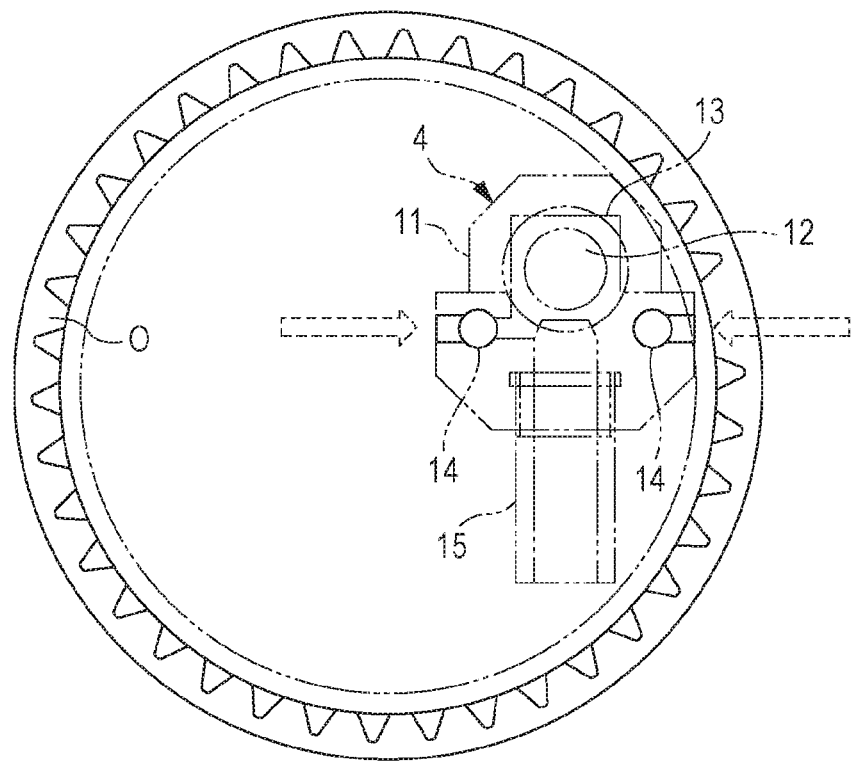
FIG. 6 is a right side view of the nozzle and the inner tooth illustrated in FIG. 5.

FIG. 5 is a front view illustrating an example in which the nozzle 4 illustrated in FIG. 4 is relatively disposed so that laser peening processing may be performed on the inner tooth of an internal gear when an object workpiece O for laser peening processing is the internal gear. FIG. 6 is a right side view of the nozzle 4 and the inner tooth illustrated in FIG. 5.

As illustrated in FIGS. 5 and 6, laser peening processing may also be performed on the inner tooth of the internal gear by the laser peening processing device 1. The internal gear is a circular gear having inner teeth, and is used to roll a smaller external gear with internally inscribed. Relative slip is repeatedly performed between two objects in contact with each other, such as the internal gear and the external gear. Fretting damage, fretting wear, fretting corrosion, and fretting fatigue are likely to occur in a component in which relative slip is repeatedly performed. In addition, reduction occurs in fatigue characteristics caused by a gear bending force or an axis bending force applied to the gear depending the operating condition of the gear.

Thus, it is desirable to perform laser peening processing of the inner teeth of an internal gear to achieve reduction in fretting damage, fretting wear, fretting corrosion, and fretting fatigue, and improvement in the fatigue strength of the gear itself. Thus, the leading end of the nozzle 4, in which interference is avoided by including in the casing 11 the pipe 14 forming the flow path of liquid, is relatively disposed internally of a hollow internal gear, and laser peening processing may be performed on the inner teeth of the internal gear.

In this manner, the leading end of the nozzle 4 may be relatively disposed in narrower space by including in the casing 11 the pipe 14 that forms the flow path of liquid. Consequently, it is possible to insert the leading end of the nozzle 4 into a hollow object workpiece O such as an internal gear, and to perform laser peening processing on the inner surface of the hollow object workpiece O. Needless to say, it is also possible to locally perform laser peening processing on not only the hollow object workpiece O but also an object workpiece O having a complicated shape.

In the illustrated example, two pipes 14 are disposed in parallel in the casing 11 with the length direction horizontal. The exit of the pipe 14 is coupled to the flow path of liquid in the vicinity of the exit of the nozzle 4 so that liquid is supplied in a horizontal direction from both sides toward the optical path of the laser beam L in a vertical lower direction on the emission side of the laser beam L from the prism 13.

In this case, the laser beam L enters the liquid on the emission side of the laser beam L from the prism 13. Specifically, the propagation medium of the laser beam L is air on the incident side of the laser beam L to the prism 13, and the propagation medium of the laser beam L is liquid on the emission side of the laser beam L from the prism 13.

The liquid, to which the laser beam L is incident, is injected from the leading end of the nozzle 4 to the object workpiece O. Then, a liquid column, such as a water column, is formed between the leading end of the nozzle 4 and the object workpiece O. The liquid column allows the laser beam L to propagate therethrough as a medium. In this manner, it is possible to irradiate the object workpiece O having a surface covered with liquid with the laser beam L.

As illustrated in FIG. 4, a tubular attachment 15 for adjusting the length of the nozzle 4 may be exchangeably attached to the leading end of the nozzle 4. Alternatively, the casing 11 of the nozzle 4 may be provided with a detachable structure 16 so that primary components of the nozzle 4 including the condenser lens 12 and the prism 13 may be detached.

In the example illustrated in FIG. 4, the casing 11 is provided with the detachable structure 16 capable of being fixed by a clamp for fixation with the nozzle 4 positioned so that liquid is not leaked by a positioning member 17 such as a key or pin for positioning and an O ring 18 for sealing. Thus, maintenance such as cleaning or replacement of the nozzle 4 is easy. It is possible to adjust the shape of the nozzle 4 to the shape of the object workpiece O by the detachable structure 16 which facilitates detachment of the nozzle 4.

The intensity of laser peening processing is the intensity I of the pulse laser with which the object workpiece O is concentratedly irradiated. Therefore, as described above, the intensity I of laser peening processing is determined by the pulse width t, the pulse energy E, and the area S of the beam spot of the laser beam L with which the object workpiece O is concentratedly irradiated. When the laser oscillator 2 is a typical oscillator like a YAG laser oscillator, the pulse width t of the laser beam L is generally determined by the specification of the laser oscillator 2. Therefore, parameters adjustable by a user of the laser peening processing device 1 are the pulse energy E and the area S of the beam spot of the laser beam L.

Specifically, the intensity I of laser peening processing is increased as the pulse energy E of the laser beam L is increased. In addition, the intensity I of laser peening processing is increased as the area S of the beam spot of the laser beam L is reduced to increase the brightness. In order to reduce the area S of the beam spot of the laser beam L as much as possible, it is important to converge the laser beam L emitted from the condenser lens 12 to the object workpiece O by using the condenser lens 12 having a short focal length as well as using spread light as the laser beam L incident on the condenser lens 12.

In addition to a mirror 19 necessary for forming the optical path of the laser beam L in the air, a beam expander 20 that changes the laser beam L oscillated by the laser oscillator 2 from a collimated beam to a beam having a spread may be provided in the optical transmission system 3. In other words, the laser beam L spread by a focus lens 21 of the beam expander 20 may be emitted to the condenser lens 12.

Thus, it is possible to converge the laser beam with which the object workpiece O is concentratedly irradiated from the condenser lens 12 and to reduce the area S of the beam spot of the laser beam L with which the object workpiece O is concentratedly irradiated so that the intensity I of laser peening processing is sufficiently high. In particular, when the beam expander 20 is a variable type, the position of the focal point of the laser beam L and the area S of the beam spot are adjustable according to the position of the object workpiece O.

The laser oscillator 2, which oscillates the laser beam L having a high intensity I, has a large size. Moreover, as described above, it is difficult to purchase a non-standardized optical fiber for transmitting the laser beam L having a high intensity I.

Thus, it is practical to fix the laser oscillator 2, the optical transmission system 3, and the nozzle 4 so as not to be moved and to move the object workpiece O during irradiation with the laser beam L. In other words, it is possible for a large-scaled laser oscillator 2 to irradiate the object workpiece O with the laser beam L having a high energy density and intensity I by fixing the nozzle 4 and moving the object workpiece O.

In the example illustrated in FIG. 2, the laser oscillator 2 and the optical transmission system 3 are stored in the casing 23 including a caster 22 with a stopper for transportation, and the nozzle 4 is fixed to a nozzle stand 24. When the energy density of the laser beam L is high, it is important to prevent the laser beam L from entering the eyes of a worker from the viewpoint of safety. Thus, it is appropriate to determine the heights of the casing 23 and the nozzle stand 24 so that the height of the optical path of the laser beam L is lower than the eye level of a worker.

The movement mechanism 6 is a device that moves the object workpiece O so that the processing position of laser peening processing is irradiated with the laser beam L. The movement mechanism 6 may be constituted by a desired device such as a robot 31 including a robot arm 30 for holding and moving the object workpiece O or a drive mechanism 33 for placing the object workpiece O on a movable table 32 and moving the object workpiece O. In the illustrated example, the movement mechanism 6 is selectably provided with one of the robot 31 that controls the robot arm 30 by a robot control device 34, and the drive mechanism 33 that drives the movable table 32 by a numerical control (NC) device 35.

Figure 7:
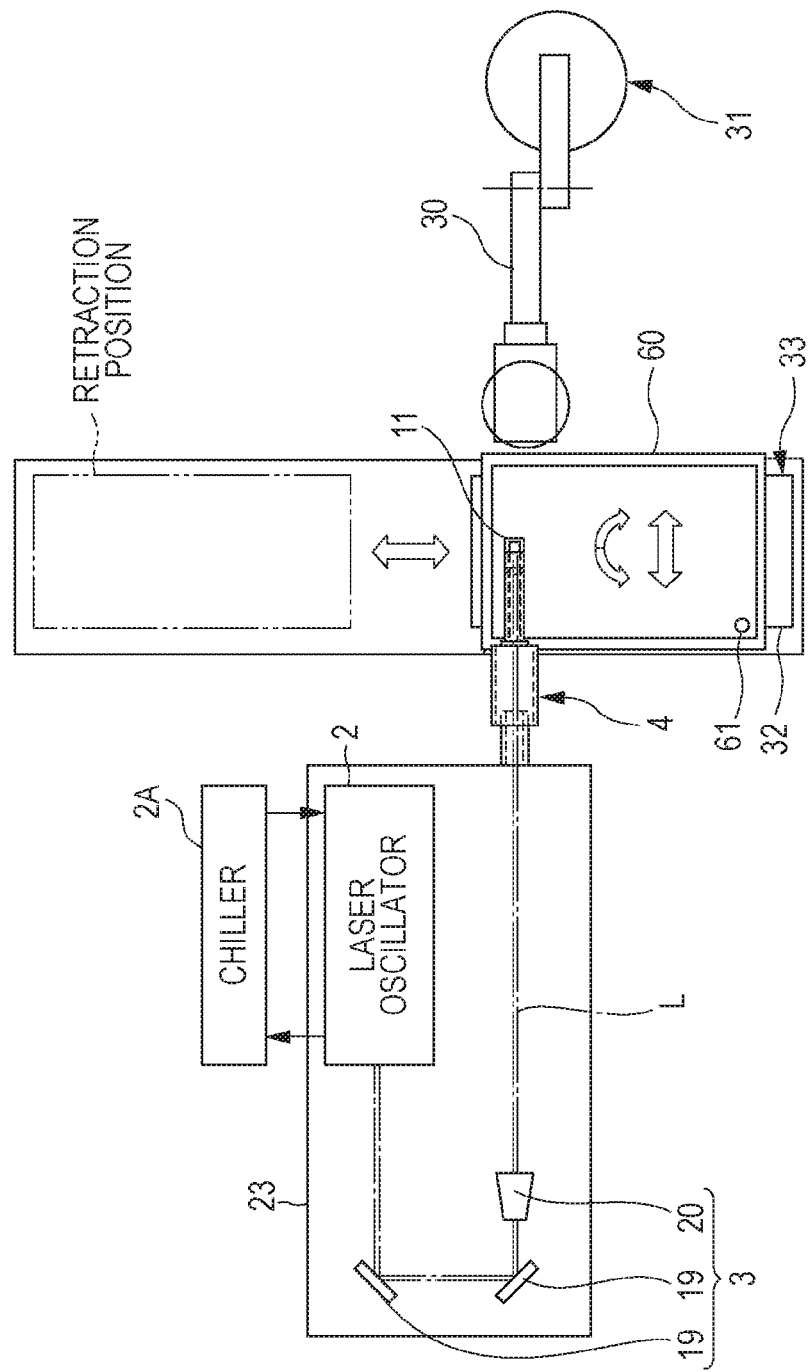
FIG. 7 is a top view illustrating an example in which an object workpiece is moved by the drive mechanism illustrated in FIG. 2.
Figure 8:
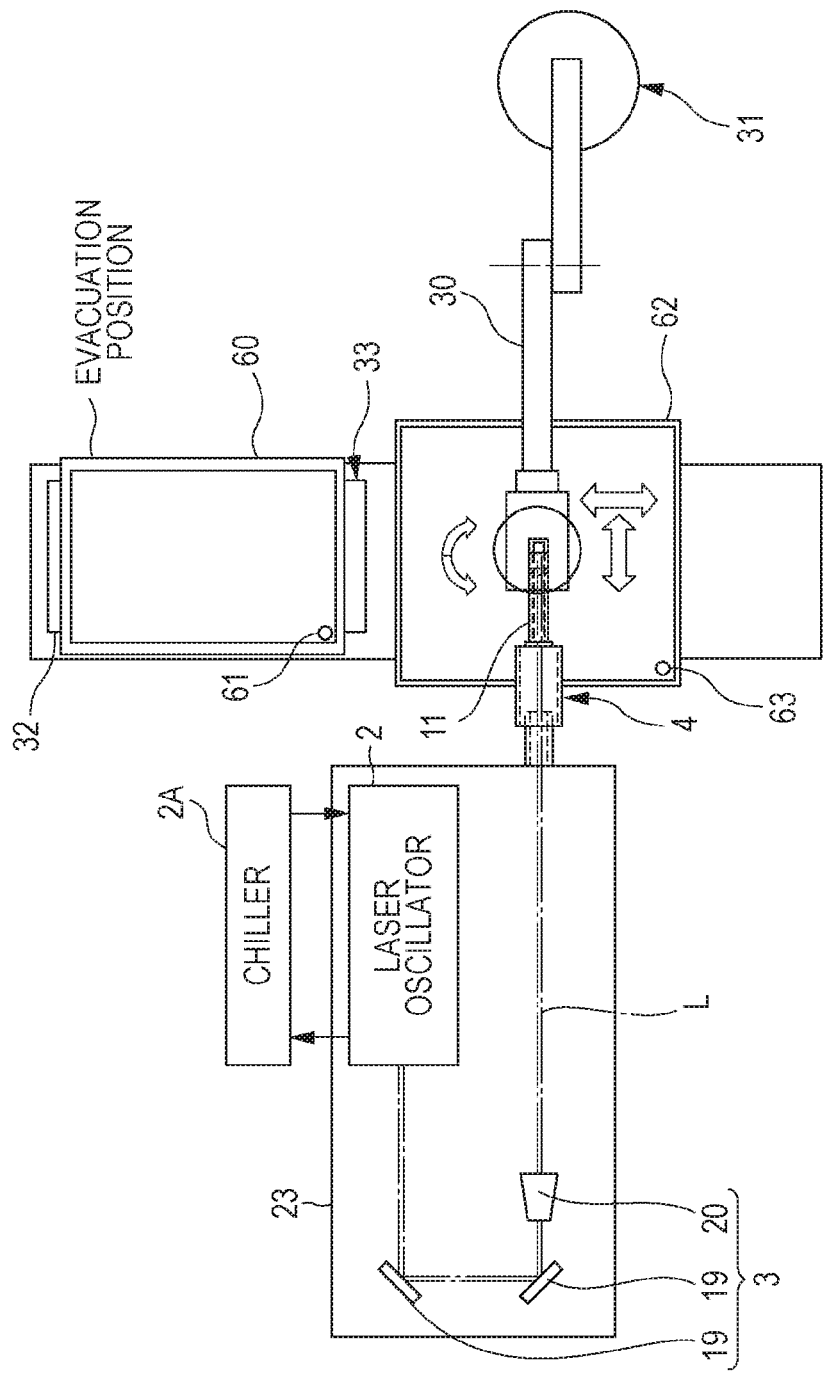
FIG. 8 is a top view illustrating an example in which an object workpiece is moved by the robot illustrated in FIG. 2.

FIG. 7 is a top view illustrating an example in which the object workpiece O is moved by the drive mechanism 33 illustrated in FIG. 2, and FIG. 8 is a top view illustrating an example in which the object workpiece O is moved by the robot 31 illustrated in FIG. 2.

As illustrated in FIGS. 7 and 8, both the movable table 32 of the drive mechanism 33 and the robot arm 30 may be configured and disposed to be retracted from the processing position of laser peening processing, which is below the nozzle 4. The number of drive shafts of the movable table 32 and the robot arm 30 may be determined at will so that a desired surface of the object workpiece O may be irradiated with the laser beam L. For example, the movable table 32 may be provided with not only a horizontal movement shaft, but also a rotational shaft.

Since a robot arm 30 having a cantilever structure includes many drive shafts, it is easy to tilt and rotate the object workpiece O, but rigidity and positioning accuracy are lower, as compared with a drive mechanism 33 having no cantilever structure. Conversely, in a drive mechanism 33 having no cantilever structure, an area where the object workpiece O may be tilted or rotated is smaller but rigidity and positioning accuracy are higher, as compared with a robot arm 30 having a cantilever structure.

Thus, the movement mechanism 6 may be configured so that one of the robot 31 and the drive mechanism 33 may be selected according to the size and weight of the object workpiece O. Specifically, when the size and weight of the object workpiece O are small, the object workpiece O may be moved by the robot 31, whereas when the size and weight of the object workpiece O are large, the object workpiece O may be moved by the drive mechanism 33.

The positioning accuracy of the drive mechanism 33 is higher than that of the robot arm 30. Thus, it is possible to control the robot arm 30 by the robot control device 34 based on positioning information on the nozzle 4 which is positioned based on an index for positioning, such as a positioning hole or a positioning plate, provided in the drive mechanism 33. Specifically, after the relative position of the nozzle 4 is adjusted to the reference position of the drive mechanism 33, positioning of the reference position of the robot arm 30 may be performed. It has been verified that such positioning enables the object workpiece O to be actually positioned with a positioning accuracy of ±0.15 mm.

The position of the focal point of the laser beam L is changed not only by the position of the object workpiece O, but also by adjustment of an optical element such as the beam expander 20 of the optical transmission system 3 as described above. Thus, adjustment of the optical elements included in the optical transmission system 3 after adjustment of the relative position of the nozzle 4 to the reference position of the drive mechanism 33 leads to improvement in the accuracy.

In order to set a coverage to an appropriate value, it is important to sufficiently ensure the acceleration of the object workpiece O in addition to the positioning accuracy of the object workpiece O, the coverage being one of the indices representing the effect of laser peening processing. In particular, when the object workpiece O has depressions and projections like a gear, it is important to move the object workpiece O by the movement mechanism 6 with acceleration and deceleration so that the focal point of the laser beam L is always formed on the surface of the object workpiece O.

Since placing of a tank for storing liquid and installing the object workpiece O is unnecessary for the movement mechanism 6 such as the drive mechanism 33 and the robot arm 30, it is possible to accelerate and decelerate the object workpiece O by a sufficient acceleration for obtaining a necessary coverage with reduced weight of the movement mechanism 6.

Specifically, in the laser peening processing device 1, the laser peening processing point of the object workpiece O is covered with liquid by injecting liquid through the nozzle 4 rather than submerging the object workpiece O for laser peening processing in a tank, thus it is possible to reduce the weight of the movement mechanism 6. Consequently, it is possible to move the object workpiece O at a speed appropriate for the frequency of the laser beam L. For instance, even when the surface figure of the object workpiece O for laser peening processing has a complicated shape like the surface figure of a gear, the speed of the object workpiece O can be changed instantaneously so that the focal point of the laser beam L is formed by following the surface of the object workpiece O.

Figure 9:
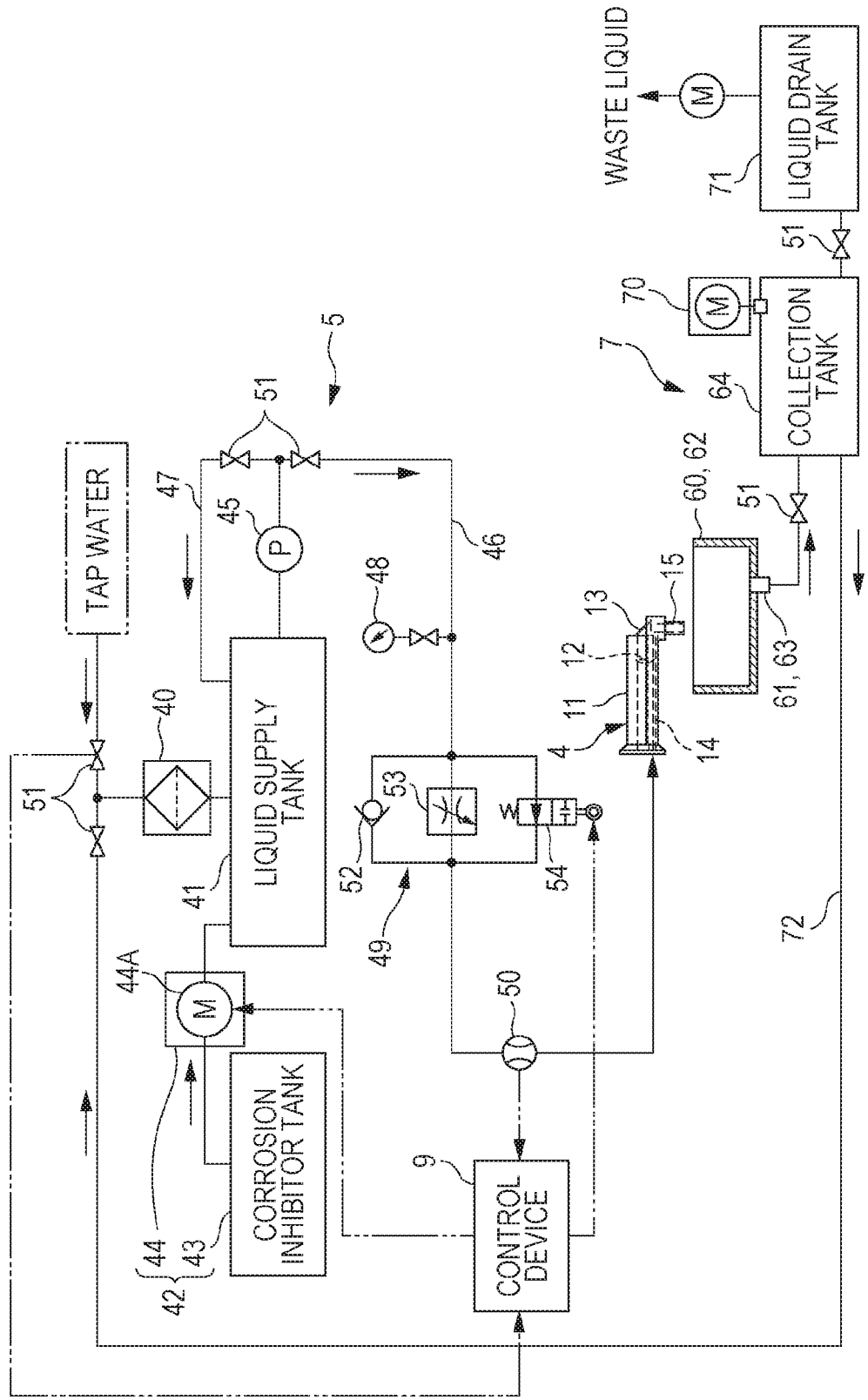
FIG. 9 is a piping diagram illustrating a detailed configuration example of a liquid supply system and a liquid collection system illustrated in FIG. 1.

FIG. 9 is a piping diagram illustrating a detailed configuration example of the liquid supply system 5 and the liquid collection system 7 illustrated in FIG. 1.

The liquid supply system 5 is a system that supplies liquid to the nozzle 4. When tap water is used as the liquid, the laser beam L is scattered by the impurities contained in tap water. Increase in the concentration of metal ions and/or metal oxides generated by laser ablation leads to decrease in the plasma waves that propagate. For this reason, it is preferable to use pure water as the liquid for laser peening processing rather than tap water.

Thus, as illustrated in FIG. 9, the liquid supply system 5 is preferably provided with a pure water unit 40 that generates pure water from non-pure water such as tap water and industrial water. The pure water unit 40 is a device that generates pure water by removing positive ions and/or negative ions contained in non-pure water with an ion-exchange resin filter.

The pure water generated by the pure water unit 40 may be stored in a liquid supply tank 41. When the object workpiece O for laser peening processing is made of metal which is easily oxidized like iron-based metal, there is a possibility that the object workpiece O may rust due to pure water. Thus, as illustrated in FIG. 9, the liquid supply system 5 is preferably provided with an addition device 42 that adds a corrosion inhibitor, such as a rust inhibitor, to pure water.

The corrosion inhibitor addition device 42 may include a corrosion inhibitor tank 43 that stores corrosion inhibitor, and a dropping device 44 that drops the corrosion inhibitor stored in the corrosion inhibitor tank 43 into the liquid supply tank 41. Addition of the corrosion inhibitor to the liquid supply tank 41 by the addition device 42 allows water having pure water mixed with the corrosion inhibitor so as to have a certain concentration to be stored in the liquid supply tank 41.

It is to be noted that although the rust inhibitor may refer to a chemical which prevents corrosion of iron in a narrow sense, in addition to when the object workpiece O is iron-based metal, even when the object workpiece O is another metal, corrosion of the metal can be prevented by adding a corrosion inhibitor to pure water. In other words, corrosion of metal can be prevented by adding a rust inhibitor in a broad sense to pure water, the rust inhibitor in a broad sense referring to a corrosion inhibitor which prevents rust of iron-based metal and non-iron-based metal.

Amine is a specific example of a corrosion inhibitor added to pure water and used. Amine is soluble in water and highly transparent, thus it is possible to red+-uce energy loss by scattering of the laser beam L. When laser peening processing is performed on an iron-based object workpiece O by actually adding amine to pure water, it has been verified that it is possible to continue laser peening processing for a long time without formation of rust.

When the liquid injected to the object workpiece O waves or scatters during laser peening processing, scattering of the laser beam L may be caused. When the scattering light of the laser beam L is reflected on the object workpiece O, the surface of the object workpiece O is oxidized. Therefore, it is desirable to prevent waving and scattering of the liquid injected to the object workpiece O. In order to prevent waving and scattering of the liquid injected to the object workpiece O, it is also important to inject liquid through the nozzle 4 with an appropriate pressure and flow rate.

Thus, as illustrated in FIG. 9, the liquid supply system 5 may include a pump 45, as a pressure-feeding device, that performs pressure feed of liquid, such as pure water or water containing pure water, stored in the liquid supply tank 41 to the nozzle 4; a liquid supply pipe 46 that forms the flow path of the liquid pressure-fed by the pump 45; a bypath pipe 47 that, when excessive liquid is pressure-fed from the pump 45, returns part of the liquid to the liquid supply tank 41; a pressure regulator 48 that regulates the pressure of the liquid pressure-fed from the pump 45; a combined flow regulating valve 49 that adjusts the flow rate of the liquid pressure-fed from the pump 45 and supplies the liquid to the nozzle 4; and a venturi meter 50 that measures the flow rate of the liquid regulated by the combined flow regulating valve 49. A necessary valve 51 may be provided at each of appropriate places of the liquid supply system 5. The pipe which forms the flow path of liquid, such as the liquid supply pipe 46 and the bypath pipe 47, may be formed of a nylon tube.

The combined flow regulating valve 49 is formed by coupling a check valve 52, a variable throttle valve 53, and a 2-port normally open control valve 54 in parallel. It is to be noted that the combined flow regulating valve 49 formed by coupling the check valve 52, the variable throttle valve 53, and the 2-port normally open control valve 54 in parallel is also called a pressure compensation combined flow rate control valve. When the pressure compensation combined flow rate control valve is used, even when the pressure of the liquid varies on the entry side and the exit side of the pressure compensation combined flow rate control valve, the liquid may be flowed with a constant flow rate.

In a state where the 2-port normally open control valve 54 of the combined flow regulating valve 49 is open, the liquid flows through the 2-port normally open control valve 54. However, when the 2-port normally open control valve 54 is mechanically closed, the liquid flows through the variable throttle valve 53 at a flow rate according to a degree of opening of the variable throttle valve 53. The degree of opening of the variable throttle valve 53 may be finely regulated with a dial or the like. When the flow rate of the liquid increases on the exit side of the combined flow regulating valve 49, the liquid which flows in a reverse direction is allowed to freely pass through the check valve 52.

Thus, the 2-port normally open control valve 54 of the combined flow regulating valve 49 is opened or closed by the control device 9 according to the flow rate of the liquid measured by the venturi meter 50, thereby making it possible to regulate the flow rate of the liquid supplied to the nozzle 4 at an appropriate level. Specifically, when the flow rate of the liquid measured by the venturi meter 50 is excessive, the flow rate of the liquid supplied to the nozzle 4 can be reduced by performing control to close the 2-port normally open control valve 54 by the control device 9. On the other hand, when the flow rate of the liquid measured by the venturi meter 50 is not excessive, the liquid can be supplied to the nozzle 4 without reducing the flow rate by performing control to open the 2-port normally open control valve 54 by the control device 9.

It is to be noted that instead of the combined flow regulating valve 49, a simple flow regulating valve may be provided, or conversely a flow regulating valve having a complicated configuration may be provided. Alternatively, a flowmeter other than the venturi meter 50, such as an electromagnetic flowmeter may be provided. In that case, the flow regulating valve can be controlled by the control device 9 so that liquid with an appropriate flow rate is supplied to the nozzle 4 based on the flow rate of the liquid measured by the flowmeter for liquid.

It is possible to stably supply the liquid to the nozzle 4 with appropriate flow rate and pressure by the above-mentioned pressure feed of the liquid by the pump 45, and flow rate control of the liquid by the combined flow regulating valve 49. Consequently, it is possible to reduce the occurrence of waving and scattering of the liquid injected through the nozzle 4, and to prevent scattering of the laser beam L and reflection of scattering light of the laser beam L on the object workpiece O for laser peening processing to oxidize the surface.

As illustrated in FIG. 9, when water obtained by adding a corrosion inhibitor to pure water is used as the liquid for laser peening processing, supply of pure water into the liquid supply tank 41 causes the concentration of the corrosion inhibitor to decrease. The same goes with when water obtained by adding a corrosion inhibitor to non-pure water, such as tap water, stored in the liquid supply tank 41 is used as the liquid for laser peening processing.

Thus, it is possible to control the addition device 42 so that the amount of addition of the corrosion inhibitor per unit time to the pure water or non-pure water such as tap water stored in the liquid supply tank 41 is constant in conjunction with the degree of opening of the valve 51 which supplies non-pure water such as tap water. Therefore, it is practical that the valve 51 which supplies non-pure water such as tap water is an electromagnetic valve which automatically performs opening and closing control including control of the degree of opening easily.

As a specific example, when the corrosion inhibitor addition device 42 is a device that drops a corrosion inhibitor by the drive of a motor 44A, it is possible to drive the motor 44A of the dropping device 44 by the control device 9 while the valve 51 which supplies tap water or the like is open. Thus, the corrosion inhibitor can be added to the liquid supply tank 41 in conjunction with the supply of water to the liquid supply tank 41.

The liquid collection system 7 is a system that collects the liquid injected through the nozzle 4. In order to ensure sufficient acceleration of the movement mechanism 6 such as the drive mechanism 33 and the robot arm 30 for moving the object workpiece O for laser peening processing, as described above, it is effective to reduce the weight of the movement mechanism 6 by injecting the liquid through the nozzle 4 instead of providing a tank that stores the liquid for installing the object workpiece O. However, as described above, when the liquid injected to the object workpiece O scatters, scattering of the laser beam L may be caused.

Thus, as illustrated in FIGS. 2 and 7, a liquid receiver 60, which receives and collects liquid and has a drainage function, may be fixed to the movable table 32 of the drive mechanism 33. In the example illustrated in FIGS. 2 and 7, the liquid receiver 60 is fixed to the movable table 32 of the drive mechanism 33 so that the liquid receiver 60, which stores the object workpiece O with an opening facing the nozzle 4, is moved along with the object workpiece O. In addition, the liquid receiver 60 is provided with a discharge outlet 61 for discharging liquid during laser peening processing. Thus, it is possible to collect the liquid by the liquid receiver 60 while preventing scattering of the liquid without excessively increasing the weight of the movable table 32.

Meanwhile, as illustrated in FIGS. 2 and 8, a liquid collection pan 62 having a drainage function may be installed in a working zone of the robot arm 30 to collect the liquid. In other words, a liquid collection pan 62 may be provided with a discharge outlet 63 for discharging the liquid during laser peening processing. Needless to say, a liquid receiver, which is moved along the robot arm 30 and has a drainage function, may be fixed to the robot arm 30 to prevent scattering of the liquid.

The liquid collection pan 62 may be installed and removed by a worker so as not to interfere with the movable table 32 of the drive mechanism 33, or may be moved to a retraction position by a movement mechanism similarly to the movable table 32 of the drive mechanism 33. Specifically, as illustrated in FIGS. 7 and 8, during collection of liquid using the liquid receiver 60 placed on the movable table 32 of the drive mechanism 33, it is possible to set the liquid collection pan 62 for liquid collection at the use of the robot arm 30 removable or retractable.

The exit side of the liquid receiver 60 and the liquid collection pan 62 may be provided with a flow path, such as a watershoot 65, for pouring into a collection tank 64 the liquid discharged from the discharge outlet 61 of the liquid receiver 60 and the discharge outlet 63 of the liquid collection pan 62. Since the collection tank 64 is not to be transferred by the movement mechanism 6, the watershoot 65 for pouring the liquid into the collection tank 64 is fixed so as not to be transferred by the movement mechanism 6.

As illustrated in FIG. 9, the collection tank 64 may be provided with an oil skimmer 70. The oil skimmer 70 is a device that collects oil drifting on the liquid level, and an electric oil skimmer 70 is configured to collect oil by attaching the oil to a steel belt driven by a motor.

As illustrated in FIG. 9, the liquid collected in the collection tank 64 may be guided to a drainage tank 71 and discharged, or may be returned to the pure water unit 40 by a circulation pipe 72 so as to be used again as the liquid for laser peening processing. Next, the detailed configuration and the detailed function of the safety system 8 and the control device 9 illustrated in FIG. 1 will be described.

The safety system 8 is a system that when abnormality such as power failure or earthquake occurs during laser peening processing, secures the quality of the object workpiece O and the safety of a user by interrupting the laser peening processing. Thus, the safety system 8 may be provided with a seismometer 80 that detects earthquake, and an uninterruptible power supply device 81.

The typical seismometer 80 is configured to detect acceleration of earthquake, and transmit a control signal when the acceleration exceeds a certain value. Thus, when earthquake is detected by the seismometer 80, the safety may be secured by emergency-stopping the power supply of the laser oscillator 2.

In contrast, the uninterruptible power supply device 81 is a power supply capable of continuing to supply electric power even when electric power is cut off due to a power failure or the like. The uninterruptible power supply device 81 used with coupling to a commercial AC power supply is called an uninterruptible power supply (UPS). The uninterruptible power supply device 81 may be used as a backup power supply for the laser oscillator 2. Thus, even when electric power is suddenly cut off due to a power failure or the like, the power supply of the laser oscillator 2 may be stopped safely by supplying electric power to from the uninterruptible power supply device 81 to a device such as the laser oscillator 2.

The control device 9 is a device that overall controls the devices and the systems included in the laser peening processing device 1. The control device 9 may include a circuit including a computer such as a programmable logic controller (PLC) which is operated by a computer program. Specifically, the control device 9 may be provided with an electric circuit including a storage device so that an electrical signal may be generated and processed as a control signal in a device and a system which are controlled by an electrical signal.

When a device and a system controlled by an optical signal, an air pressure signal, or a hydraulic pressure signal are provided, the control device 9 may be provided with an optical signal circuit, an air pressure signal circuit, or a hydraulic pressure signal circuit so that the optical signal, the air pressure signal, or the hydraulic pressure signal may be generated and processed as a control signal.

Specifically, the control device 9 may be provided with a function of controlling switching between ON/OFF of the laser beam L by starting and stopping the power supply of the laser oscillator 2 and output of the laser beam L; a function of controlling a controllable optical element when the optical transmission system 3 includes the optical element like when the beam expander 20 included in the optical transmission system 3 is an automatic variable beam expander; a function of controlling the robot 31 by transferring a program which controls the operation of the robot arm 30 of the robot 31 to the robot control device 34; a function of controlling the drive mechanism 33 by transferring a program for performing control of the drive mechanism 33 including movement of the movable table 32 to the NC device 35; a function of controlling each of the valves and the pump 45 to be controlled including the corrosion inhibitor addition device 42, and the 2-port normally open control valve 54 of the combined flow regulating valve 49 which are provided in the liquid supply system 5; a function of controlling power units such as valves and a motor to be controlled in the liquid collection system 7; and a function of controlling each device utilizing the safety system 8. It is to be noted that part or all of these controls may be made automatic control.

As described above, specific examples of control of devices performed by the control device 9 utilizing the safety system 8 include upon detection of an earthquake by the seismometer 80, control of stopping oscillation of the laser beam L from the laser oscillator 2, and at the time of a power failure, control of starting the uninterruptible power supply device 81, and safely stopping the laser oscillator 2 with the electric power supplied from the uninterruptible power supply device 81.

For each object workpiece O for laser peening processing, the control described above is stored as a sequence program in a storage device in the control device 9, and is performed in mutual cooperation according to the shape of the object workpiece O. In addition, it is practical to record the output of the laser beam L, the amount of ejection of liquid, and the temperature of the optical transmission system 3 on the control device 9 as monitoring data, and to be able to ex-post check whether the conditions for laser peening processing appropriate. Specifically, the control device 9 may be provided with a function of recording information for ensuring traceability of laser peening processing.

The operation panel 10 includes an input device 90 and a display 91, and is a user interface that receives information necessary for the control device 9, and displays information outputted from the control device 9.

(Laser Peening Processing Method)

Next, the laser peening processing method using the laser peening processing device 1 will be described.

When the laser peening processing device 1 performs laser peening processing on the object workpiece O, the object workpiece O is fixed to one of the movable table 32 of the drive mechanism 33 and the robot arm 30 as illustrated in FIGS. 2, 7, and 8 directly or indirectly via a jig. As a practical example, when the size and weight of the object workpiece O are small, the object workpiece O may be mounted on the robot arm 30 so that the object workpiece O may be tilted and rotated easily. On the other hand, when the size and weight of the object workpiece O are large, in order to secure positioning accuracy, the object workpiece O may be mounted on the movable table 32 of the drive mechanism 33 having high positioning accuracy and rigidity.

The object workpiece O fixed to the movable table 32 of the drive mechanism 33 or the robot arm 30 is positioned so that the focal point of the laser beam L emitted through the nozzle 4 is the position of laser peening processing on the surface of the object workpiece O. Therefore, the control program of the drive mechanism 33 or the robot 31 is outputted from the control device 9 to the NC device 35 or the robot control device 34. Thus, the movable table 32 of the drive mechanism 33 or the robot arm 30 of the robot 31 is moved by the control performed by the NC device 35 or the robot control device 34, and the object workpiece O may be positioned at an appropriate position below the nozzle 4.

Next, liquid is supplied to the nozzle 4 from the liquid supply system 5 having the configuration as illustrated in FIG. 9 under the control performed by the control device 9. In the case of the liquid supply system 5 having the configuration illustrated in FIG. 9, specifically, pure water generated from tap water or the like by the pure water unit 40 is supplied to the liquid supply tank 41.

In addition, a corrosion inhibitor such as a rust inhibitor is added to the pure water stored in the liquid supply tank 41 by the operation of the addition device 42 under the automatic control performed by the control device 9. More specifically, while the valve 51 which supplies tap water or the like to the pure water unit 40 is open, the corrosion inhibitor stored in the corrosion inhibitor tank 43 is dropped into the liquid supply tank 41 by the dropping device 44. Specifically, the motor 44A of the dropping device 44 is driven, and the corrosion inhibitor can be dropped into the liquid supply tank 41 in conjunction with opening and closing of the valve 51 which supplies tap water or the like under the automatic control performed by the control device 9.

Thus, water having pure water mixed with the corrosion inhibitor so as to have a certain concentration is stored in the liquid supply tank 41 as the liquid for confining the plasma generated when the object workpiece O is irradiated with the laser beam L for laser peening processing.

Next, the pump 45 is driven under the control of the control device 9. Thus, the water stored in the liquid supply tank 41 is discharged through the liquid supply pipe 46. The pressure of the water discharged through the liquid supply pipe 46 by driving of the pump 45 is regulated by the pressure regulator 48. The water with the regulated pressure is supplied to the nozzle 4 through the combined flow regulating valve 49 and the venturi meter 50. The venturi meter 50 measures the flow rate of the water which flows through the liquid supply pipe 46. The control device 9 performs feedback control of the combined flow regulating valve 49 based on the flow rate of the water measured by the venturi meter 50.

Figure 10:
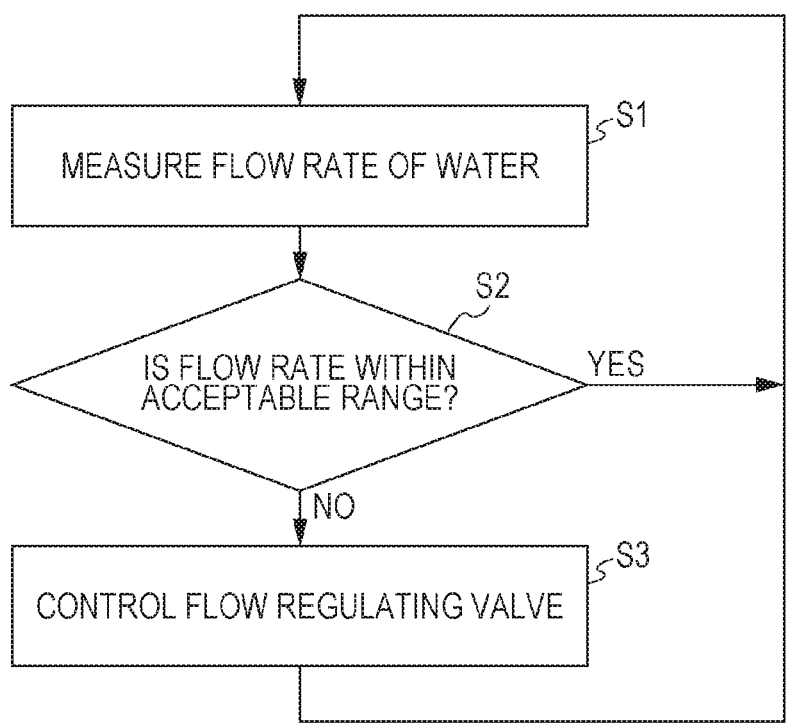
FIG. 10 is a flowchart illustrating a control algorithm for a combined flow regulating valve, used by a control device based on the flow rate of water measured by the venturi meter illustrated in FIG. 9.

FIG. 10 is a flowchart illustrating a control algorithm for the combined flow regulating valve 49, used by the control device 9 based on the flow rate of water measured by the venturi meter 50 illustrated in FIG. 9.

First, in step S1, the flow rate of the water which flows through the liquid supply pipe 46 is measured by the venturi meter 50. A measurement value of the flow rate of the water is outputted to the control device 9. Next, in determination of step S2, it is determined in the control device whether the measurement value of the flow rate of the water 9 is in an acceptable range defined as the range between an upper limit and a lower limit. When the determination in step S2 indicates YES, specifically, when the measurement value of the flow rate of the water is determined to be within the acceptable range in the control device 9, acquisition of the measurement value of the flow rate of the water measured by the venturi meter 50 in step S1 is continuously performed again.

On the other hand, when the determination in step S2 indicates NO, specifically, when the measurement value of the flow rate of the water is determined to be out of the acceptable range in the control device 9, in step S3, control of the combined flow regulating valve 49 by the control device 9 is performed. Specifically, in a state where the 2-port normally open control valve 54 of the combined flow regulating valve 49 is open, when the measurement value of the flow rate of the water is determined to exceed an upper limit, a control signal to close the 2-port normally open control valve 54 is outputted from the control device 9, and the 2-port normally open control valve 54 is closed. Conversely, in a state where the 2-port normally open control valve 54 of the combined flow regulating valve 49 is closed, when the measurement value of the flow rate of the water is determined to fall below an upper limit, a control signal to open the 2-port normally open control valve 54 is outputted from the control device 9, and the 2-port normally open control valve 54 is opened.

For instance, when opening and closing of the 2-port normally open control valve 54 is mechanically controlled, the 2-port normally open control valve 54 is opened and closed by a drive mechanism such as a bar which is moved by a control signal outputted from the control device 9. On the other hand, when opening and closing of the 2-port normally open control valve 54 is electromagnetically controlled, the 2-port normally open control valve 54 is opened and closed by a control signal outputted from the control device 9.

When the 2-port normally open control valve 54 is closed, the path of the water which flows through the combined flow regulating valve 49 is changed from the 2-port normally open control valve 54 to the variable throttle valve 53. The degree of opening of the variable throttle valve 53 is regulated so that the water with a flow rate in a predetermined acceptable range flows. Consequently, water with a flow rate in an acceptable range according to the degree of opening of the variable throttle valve 53 flows out through the combined flow regulating valve 49. Conversely, when the 2-port normally open control valve 54 is opened, the path of the water which flows through the combined flow regulating valve 49 is changed from the variable throttle valve 53 to the 2-port normally open control valve 54. Consequently, when the flow rate of water is in an acceptable range, the water may be flowed without reducing the flow rate.

In this manner, the water containing the corrosion inhibitor with regulated pressure and flow rate flows into the entry of the pipe 14 disposed in the nozzle 4 through the liquid supply pipe 46 made of a nylon tube or the like as illustrated in FIGS. 4 to 6. Also, as illustrated in FIG. 9, the water on the upstream, excessively pressure-fed from the pump 45 by regulation of the pressure and flow rate of the water on the downstream side is returned to the liquid supply tank 41 through the bypath pipe 47.

The water which flowed into the pipe 14 in the nozzle 4 flows out from the exit through the pipe 14. The water which flows out from the exit of the pipe 14 is injected from the exit of the nozzle 4 to the object workpiece O of laser peening processing through a water path in the vicinity of the exit of the nozzle 4. Consequently, a water column is formed between the exit of the nozzle 4 and the surface of the object workpiece O. The water column formed may be used as a medium which allows the laser beam L to propagate therethrough.

Subsequently, the laser beam L is guided to the nozzle 4 by the optical transmission system 3 and the laser oscillator 2 having the configuration as illustrated in FIG. 3 under the control of the control device 9. Specifically, the laser beam L is oscillated from the laser oscillator 2 cooled by the chiller 2A in advance under the control of the control device 9. The laser beam L oscillated as a collimated beam from the laser oscillator 2 propagates through air while reflecting by the mirror 19 included in the optical transmission system 3, and enters the beam expander 20.

The laser beam L incident on the beam expander 20 becomes a beam having a spread by the focus lens 21, and enters the nozzle 4. As illustrated in FIGS. 4 and 5, the laser beam L incident on the nozzle 4 enters the condenser lens 12. The laser beam L which has passed through the condenser lens 12 enters the prism 13 while converging. The laser beam L incident on the prism 13 changes the traveling direction from a horizontal direction to a vertical lower direction, and emits from the prism 13.

A water path and a water column are formed on the emission side of the prism 13. Thus, the laser beam L concentrated by the condenser lens 12 propagates through a water column while converging as illustrated in FIG. 2, and is radiated to the object workpiece O. When the object workpiece O is irradiated with the laser beam L, plasma is generated. The generated plasma is confined in the water which has been injected through the nozzle 4. Consequently, the pressure of a shock wave is applied to the surface of the object workpiece O, and laser peening processing can be performed.

Such laser peening processing can be performed while moving the object workpiece O by the movement mechanism 6 such as the drive mechanism 33 and the robot 31 under the control of the control device 9. Specifically, laser peening processing can be performed while the object workpiece O is moved by the movable table 32 of the drive mechanism 33 or the robot arm 30, and a processing point is changed every moment. In particular, the water injected through the nozzle 4 flows through the pipe 14 disposed in the nozzle 4, thus as illustrated in FIGS. 5 and 6, even in a narrow place like the inner surface of an internal gear, the object workpiece O can be moved without interference with the nozzle 4.

Then, half-finished products or products can be manufactured by performing laser peening processing on all the processing points of the object workpiece O using the laser peening processing device 1. As a specific example, it is possible to manufacture half-finished products or products having a complicated shape like an internal gear having inner teeth on which laser peening processing has been performed.

The water injected to the object workpiece O can be collected by the liquid collection system 7. When the object workpiece O is fixed to the movable table 32 of the drive mechanism 33, the water is collected by the liquid receiver 60 that stores the object workpiece O. The water collected by the liquid receiver 60 is discharged through the discharge outlet 61, flows through the watershoot 65, and flows into the collection tank 64. On the other hand, when the object workpiece O is fixed to the robot arm 30, the water is collected by the liquid collection pan 62 installed in a working zone of the robot arm 30. The water collected by the liquid collection pan 62 is discharged through the discharge outlet 63, flows through the watershoot 65, and flows into the collection tank 64.

In the collection tank 64, oil is removed by the oil skimmer 70 as necessary. Subsequently, the water collected by the collection tank 64 is discarded or reused. When water is discarded, the water is guided from the collection tank 64 to the drainage tank 71, and is discarded from the drainage tank 71. On the other hand, when water is reused as the liquid for laser peening processing, the water is returned from the collection tank 64 to the pure water unit 40 via the circulation pipe 72.

It is to be noted that when power failure or earthquake occurs, the laser peening processing device 1 can be safely stopped by the operation of the safety system 8. For instance, when a power failure occurs, electric power can be supplied from the uninterruptible power supply device 81 to each device of the laser peening processing device 1. Thus, it is possible to safely stop a device which has effect on the safety and quality of the laser oscillator 2. On the other hand, when earthquake occurs, the earthquake is detected by the seismometer 80, thus the power supply or the like of the laser oscillator 2 can be emergency-stopped by automatic control performed by the control device 9.

Effects

In the laser peening processing devices 1 and the laser peening processing method as described above, the pipe 14 for the liquid for laser peening processing is disposed in the nozzle 4. Therefore, with the laser peening processing device 1 and the laser peening processing method, an interference area of the nozzle 4 may be reduced. Consequently, even when the object workpiece O for laser peening processing has a complicated shape, it is possible to locally perform laser peening processing.

It is possible to achieve reduction in fretting damage, fretting wear, fretting corrosion, and fretting fatigue caused by repeated relative slip, by laser peening processing, between two objects in contact with each other like a press-in member of an axis and a gear. In addition, improvement in the fatigue strength of the gear itself may be achieved by laser peening processing.

Second Embodiment

Figure 11:
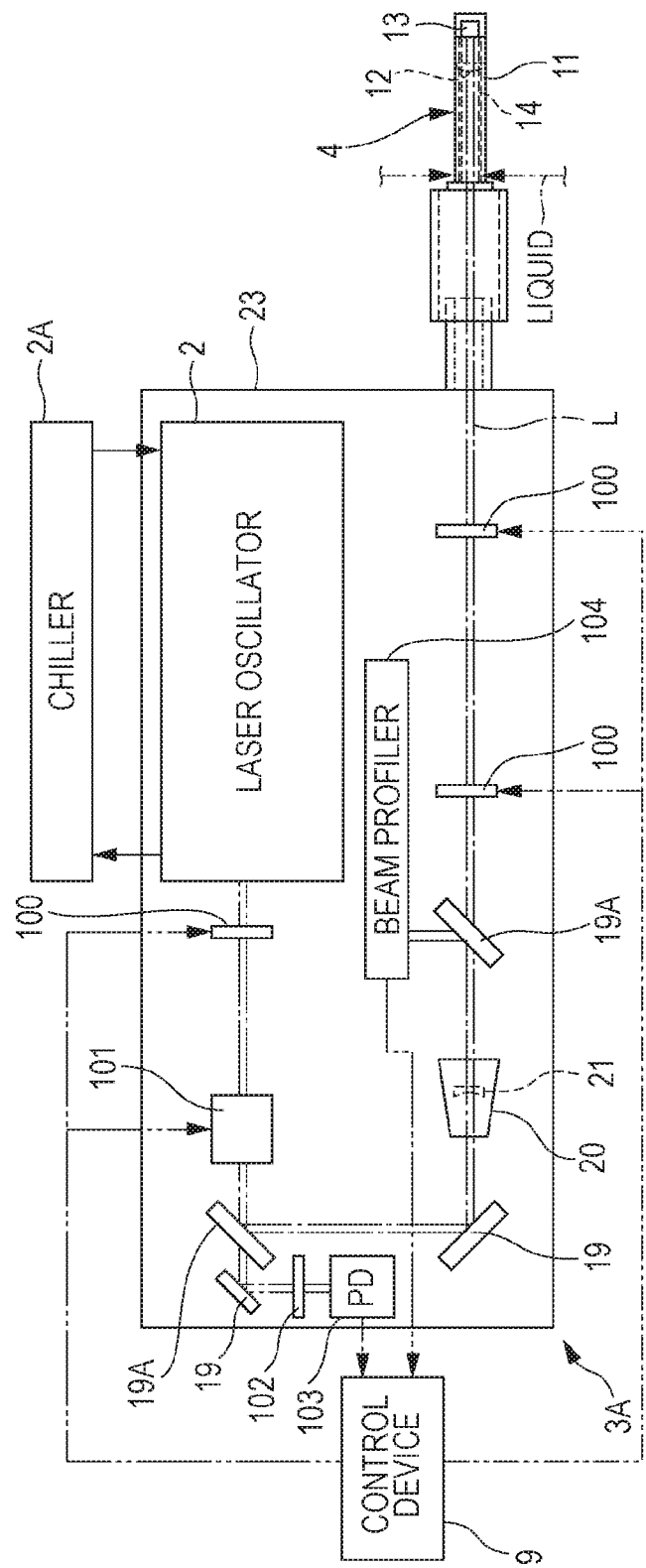
FIG. 11 is a top view of a laser oscillator, an optical transmission system, and a nozzle included in a laser peening processing device according to a second embodiment of the disclosure.

FIG. 11 is a top view of a laser oscillator, an optical transmission system, and a nozzle included in a laser peening processing device according to a second embodiment of the disclosure.

In a laser peening processing device 1A in the second embodiment illustrated in FIG. 11, the configuration of an optical transmission system 3A and the detailed function of the control device 9 differ from those in the laser peening processing device 1 in the first embodiment. Other configuration and operation of the laser peening processing device 1A in the second embodiment are substantially the same as those of the laser peening processing device 1 in the first embodiment. Thus, only the laser oscillator 2, the optical transmission system 3A, nozzle 4, and the control device 9 are illustrated, and the same configuration or corresponding configuration are labeled with the same symbol, and a description is omitted.

Similarly to the optical transmission system 3 in the first embodiment, in addition to the mirror 19 and the beam expander 20, a shutter 100, an attenuator 101, a wavelength plate 102, a photo detector (PD) 103, and a beam profiler 104 are provided in the optical transmission system 3A of the laser peening processing device 1A in the second embodiment.

The shutter 100 is an optical device that opens and closes the optical path of the laser beam L oscillated from the laser oscillator 2, and when the shutter 100 is closed, the optical path of the laser beam L can be closed. The attenuator 101 is an optical device that attenuates the intensity of the laser beam L. The output of the laser beam L incident on the condenser lens 12 can be attenuated to an appropriate level (amplitude) by the control of the attenuator 101.

Part of the mirror 19 is made to be a transmissive half mirror (beam splitter) 19A, and the wavelength plate 102 and the photo detector 103 such as a photo diode are disposed so that the intensity of the laser beam L separated by the half mirror 19A is detectable. In the example illustrated in FIG. 11, the wavelength plate 102 and the photo detector 103 are disposed so that the intensity of the laser beam L which has passed through the half mirror 19A is detectable. However, the photo detector 103 may be disposed so that the intensity of the laser beam L which has reflected by the half mirror 19A is detectable.

Therefore, the output of the laser beam L substantially incident on the condenser lens 12 is detectable by the photo detector 103. The detection signal of the output of the laser beam L detected by the photo detector 103 is outputted to the control device 9. The control device 9 is configured to be able to control the optical transmission system 3A based on the output of the laser beam L detected by the photo detector 103.

Figure 12:
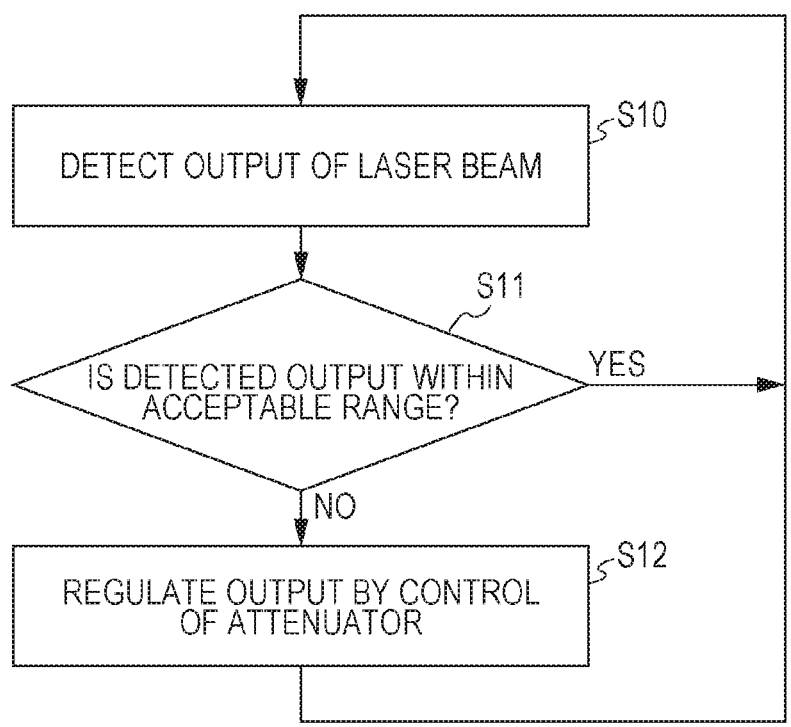
FIG. 12 is a flowchart illustrating a control algorithm used by a control device of the optical transmission system illustrated in FIG. 11.

FIG. 12 is a flowchart illustrating a control algorithm used by the control device of the optical transmission system 3A illustrated in FIG. 11.

It is necessary to maintain the output of the laser beam L in a certain range during laser peening processing. In step S10, the output of the laser beam L is detected by the photo detector 103, and when the detection value of the output of the laser beam L is outputted from the photo detector 103 to the control device 9, in step S11, the control device 9 determines whether the measurement value of the output of the laser beam L is in an acceptable range defined as the range between an upper limit and a lower limit.

When the determination in step S11 indicates YES, specifically, when the detection value of the output of the laser beam L is determined to be within the acceptable range in the control device 9, detection of the output of the laser beam L by the photo detector 103 and output of the detection value of the output of the laser beam L to the control device 9 in step S10 are continuously performed again.

On the other hand, when the determination in step S11 indicates NO, specifically, when the detection value of the output of the laser beam L is determined to be out of the acceptable range in the control device 9, in step S12, control of the attenuator 101 by the control device 9 is performed. Specifically, the control device 9 automatically controls the attenuator 101 to keep the output of the laser beam L incident on the condenser lens 12 within the acceptable range based on the detection value of the output of the laser beam L detected by the photo detector 103.

Thus, the output of the laser beam L can be maintained in a certain range during the laser peening processing. Specifically, feedback control can be performed on the attenuator 101 based on the detection value of the output of the laser beam L detected by the photo detector 103 so that the output of the laser beam L falls within the acceptable range during the laser peening processing.

When the output of the laser beam L exceeds an acceptable value even with adjustment of the attenuator 101, propagation of the laser beam L is blocked by closing the shutter 100 by automatic control by the control device 9, then the laser oscillator 2 may be stopped. Thus, it is possible to avoid a situation where the object workpiece O for laser peening processing is irradiated with the laser beam L having an excessive output.

Not only when the output of the laser beam L is abnormal, but also when the shape of the laser beam L is abnormal, propagation of the laser beam L may be automatically blocked. In this case, as illustrated in FIG. 11, it is possible to separate part of the laser beam L by the half mirror 19A, and cause the part to be incident on the beam profiler 104. A signal representing a result of measurement of the shape of the laser beam L measured by the beam profiler 104 may be outputted to the control device 9. In the control device 9, it is automatically determined whether the shape of the laser beam L measured by the beam profiler 104 is abnormal, and when the shape of the laser beam L is determined to be abnormal, the shutter 100 may be automatically closed and automatic control of stopping the laser oscillator 2 may be performed. Also when the shape of the laser beam L is abnormal, it is possible to avoid a situation where the object workpiece O for the laser peening processing is irradiated with the laser beam L.

The laser peening processing device 1A in the second embodiment as described above is capable of performing automatic control so that the output of the laser beam L falls within an appropriate range during laser peening processing. Therefore, according to the second embodiment, it is possible to automatically adjust the intensity of the laser peening to an appropriate level. Consequently, the quality of the object workpiece O after laser peening processing may be favorably maintained. In addition, when the intensity of laser beam L becomes abnormal even with automatic adjustment or when the shape of the laser beam L is abnormality, it is possible to block the propagation of the laser beam.

Other Embodiments

Although specific embodiments have been described above, the embodiments are only examples, and are not intended to limit the scope of the disclosure. The novel method and device described herein may be implemented in other various forms. In the method and device described herein, various omissions, substitutions, and changes may be made within a scope not departing from the spirit of the disclosure. The accompanying claims and their equivalents are included in the scope and spirit of the disclosure, and include such various forms and modifications.

The invention claimed is:

1. A laser peening processing device comprising:
a laser oscillator configured to oscillate a laser beam;
a nozzle configured to inject liquid to a workpiece for laser peening processing, and to cause the laser beam to be incident on the liquid and propagate through the liquid to irradiate the workpiece with the laser beam;
a robot arm configured to hold a first workpiece having a first weight;
a drive mechanism comprising a table on which a second workpiece having a second weight is disposed, the first weight is lighter than the second weight;
a first controller programed to (1) move the robot arm to place the first workpiece at a processing position where the first workpiece is irradiated with the laser beam, and (2) retract the robot arm from the processing position when the second workpiece is processed at the processing position; and
a second controller programed to (1) move the drive mechanism to place the second workpiece at the processing position where the second workpiece is irradiated with the laser beam, and (2) retract the drive mechanism from the processing position when the first workpiece is processed at the processing position,
wherein the nozzle comprises:
a cylindrical casing in which an optical path of the laser beam is formed such that the cylindrical casing protects the laser beam before the laser beam is incident on the liquid;
a lens disposed on the optical path of the laser beam in the cylindrical casing, the lens being configured to concentrate the laser beam so that a focal point of the laser beam is formed at the processing position of the laser peening processing;
a prism disposed on the optical path of the laser beam, the prism being configured to i) receive the laser beam on an incident surface of the prism, ii) change a traveling direction of the laser beam from a first direction to a second direction that differs from the first direction, and iii) emit the received laser beam from an emission surface of the prism, wherein the second direction extends from a top of the laser peening processing device to a bottom of the laser peening processing device; and
a pipe disposed in the cylindrical casing, and configured to form a flow path for the liquid,
wherein an exit of the pipe is disposed between the prism and the workpiece to form a column of the liquid extending from the emission surface of the prism to a surface of the workpiece in the second direction,
wherein the laser beam emitted from the emission surface of the prism i) propagates through an entire length of the column of the liquid extending from the emission surface of the prism to the surface of the workpiece in the second direction and ii) radiates the surface of the workpiece covered with the liquid,
wherein the laser peening processing device further comprises a liquid collection system configured to collect the liquid injected through the nozzle, and
wherein the liquid collection system comprises:
a first liquid receiver, fixed to the table of the drive mechanism, configured to collect the liquid from the nozzle and discharge the liquid from a first discharge outlet;
a second liquid receiver, disposed at the processing position during the laser peening processing using the robot arm or fixed to the robot arm, configured to collect the liquid from the nozzle and discharge the liquid from a second discharge outlet; and
a flow path configured to allow the liquid discharged through the first and second discharge outlets to flow.

2. The laser peening processing device according to claim 1, further comprising
an optical transmission system configured to transmit the laser beam oscillated by the laser oscillator to the nozzle without using an optical fiber,
wherein the laser oscillator is an oscillator configured to oscillate nanosecond laser having a pulse energy exceeding 50 mJ, picosecond laser having a pulse energy exceeding 1 mJ, or femtosecond laser having a pulse energy exceeding 1 mJ.

3. The laser peening processing device according to claim 1, further comprising:
an attenuator configured to attenuate an output of the laser beam incident on the lens;
a photo detector configured to detect the output of the laser beam incident on the lens; and
a second control device configured to control the attenuator on a basis of the output of the laser beam detected by the photo detector so that the output of the laser beam incident on the lens falls within an acceptable range.

4. The laser peening processing device according to claim 1, further comprising:
a seismometer configured to detect an earthquake;
an uninterruptible power supply device used as a backup power supply for the laser oscillator; and
a control device configured to, upon detection of an earthquake by the seismometer, perform control of stopping oscillation of the laser beam from the laser oscillator, and upon a power failure, perform control of starting the uninterruptible power supply device, and stopping the laser oscillator with electric power supplied from the uninterruptible power supply device.

5. The laser peening processing device according to claim 1, further comprising:
a pure water unit configured to generate pure water from water which is not pure water;

a pump configured to pressure-feed the pure water generated by the pure water unit or water containing the pure water; and a flow regulating valve configured to regulate a flow rate of the pure water or the water containing the pure water pressure-fed by the pump, and to supply the pure water or the water containing the pure water as the liquid to the nozzle.

6. The laser peening processing device according to claim 5, further comprising an addition device configured to add a corrosion inhibitor to the pure water in conjunction with a degree of opening of a valve configured to supply the water which is not pure water so that an amount of addition of the corrosion inhibitor per unit time is constant.

7. A laser peening processing method, comprising producing a half-finished product or a product by performing the laser peening processing on the workpiece using the laser peening processing device according to claim 1.

8. The laser peening processing device according to claim 1, wherein the nozzle further comprises a tubular attachment disposed between the prism and the workpiece, and coupled to the exit of the pipe, wherein the tubular attachment is configured to form an end of the optical path, and wherein the tubular attachment is exchangeably attached to the casing.

9. A laser peening processing method using a laser peening processing device, wherein the laser peening processing device comprises:

a laser oscillator configured to oscillate a laser beam; and a nozzle configured to inject liquid to a workpiece for laser peening processing, and to cause the laser beam to be incident on the liquid and propagate through the liquid to irradiate the workpiece with the laser beam;

a robot arm configured to hold a first workpiece having a first weight; and a drive mechanism comprising a table on which a second workpiece having a second weight is disposed, the first weight being lighter than the second weight, wherein the nozzle comprises:

a cylindrical casing in which an optical path of the laser beam is formed such that the cylindrical casing protects the laser beam before the laser beam is incident on the liquid;

a lens disposed on the optical path of the laser beam in the cylindrical casing, the lens being configured to concentrate the laser beam so that a focal point of the laser beam is formed at a processing position of the laser peening processing;

a prism disposed on the optical path of the laser beam, the prism being configured to i) receive the laser beam on an incident surface of the prism, ii) change a traveling direction of the laser beam from a first direction to a second direction that differs from the first direction, and iii) emit the received laser beam from an emission surface of the prism, wherein the second direction extends from a top of the laser peening processing device to a bottom of the laser peening processing device; and a pipe disposed in the cylindrical casing, and configured to form a flow path for the liquid, wherein an exit of the pipe is disposed between the prism and the workpiece to form a column of the liquid extending from the emission surface of the prism to a surface of the workpiece in the second direction, wherein the laser beam emitted from the emission surface of the prism i) propagates through an entire length of the column of the liquid extending from the emission surface of the prism to the surface of the workpiece in the second direction and ii) radiates the surface of the workpiece covered with the liquid, wherein the laser peening processing device further comprises a liquid collection system configured to collect the liquid injected through the nozzle, and wherein the liquid collection system comprises:

a first liquid receiver, fixed to the table of the drive mechanism, configured to collect the liquid from the nozzle and discharge the liquid from a first discharge outlet;

a second liquid receiver, disposed at the processing position during the laser peening processing using the robot arm or fixed to the robot arm, configured to collect the liquid from the nozzle and discharge the liquid from a second discharge outlet; and a flow path configured to allow the liquid discharged through the first and second discharge outlets to flow, wherein the laser peening processing method comprising:

using a program of a first controller of the laser peening processing device, (1) moving the robot arm to place the first workpiece at a processing position where the first workpiece is irradiated with the laser beam, and (2) retracting the robot arm from the processing position when the second workpiece is processed at the processing position; and using a program of a second controller of the laser peening processing device, (1) moving the drive mechanism to place the second workpiece at the processing position where the second workpiece is irradiated with the laser beam, and (2) retracting the drive mechanism from the processing position when the first workpiece is processed at the processing position.

10. The laser peening processing method according to claim 7, wherein a leading end of the nozzle is inserted in an inner side of a hollow workpiece, and laser peening processing is performed on an inner surface of the hollow workpiece.

11. The laser peening processing method according to claim 7, wherein a corrosion inhibitor is added to the liquid.

12. The laser peening processing device according to claim 1, wherein the drive mechanism comprises an index for positioning, wherein the controller is configured to control the robot arm based on positioning information on the nozzle which is positioned based on the index for positioning.

* * * * *